(12) United States Patent
Eo

(10) Patent No.: US 6,590,582 B1
(45) Date of Patent: Jul. 8, 2003

(54) CLIPPING PROCESSING METHOD

(75) Inventor: Kil-Su Eo, Kyonggi-do (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/301,539

(22) Filed: Apr. 29, 1999

(30) Foreign Application Priority Data

Apr. 29, 1998 (KR) .............................................. 98-15353

(51) Int. Cl.$^7$ .............................................. G06T 15/40
(52) U.S. Cl. ........................ 345/620; 345/621; 345/622; 345/623; 345/624
(58) Field of Search .................................. 345/619, 620, 345/621, 622, 623, 624, 625, 626, 627, 628

(56) References Cited

U.S. PATENT DOCUMENTS

| | | | | | |
|---|---|---|---|---|---|
| 4,862,392 A | * | 8/1989 | Steiner | ........................ | 364/522 |
| 4,967,375 A | * | 10/1990 | Pelham et al. | ............... | 364/518 |
| 5,040,130 A | * | 8/1991 | Chang et al. | ................ | 364/521 |
| 5,357,600 A | * | 10/1994 | Shirman et al. | ............ | 395/133 |
| 5,428,716 A | * | 6/1995 | Brokenshire et al. | ....... | 395/121 |
| 5,757,321 A | * | 5/1998 | Billyard | ........................ | 345/434 |
| 5,877,773 A | * | 3/1999 | Rossin et al. | ................ | 345/434 |
| 5,923,330 A | * | 7/1999 | Tarlton et al. | .............. | 345/419 |
| 6,018,348 A | * | 1/2000 | Sprague | ........................ | 345/421 |
| 6,054,991 A | * | 4/2000 | Crane et al. | ................. | 345/420 |
| 6,184,857 B1 | * | 2/2001 | Latham | ........................ | 345/112 |

* cited by examiner

*Primary Examiner*—Michael Razavi
*Assistant Examiner*—Daniel J Chung
(74) *Attorney, Agent, or Firm*—Sughrue Mion, PLLC

(57) ABSTRACT

A method for determining a position at which a polygon to be clipped is situated with respect to a clipping plane to perform clipping processing, includes the steps of selecting a bounding volume sufficiently enclosing the polygon, and judging a position at which the bounding volume is situated with respect to the clipping plane to be the position at which the polygon is situated.

4 Claims, 8 Drawing Sheets

CLIPPING PROCESSING METHOD

CLAIM OF PRIORITY

This application makes reference to, incorporates the same herein, and claims all benefits accruing under 35 U.S.C. '119 from an application entitled CLIPPING PROCESSING METHOD earlier filed in the Korean Industrial Property Office on Apr. 29, 1998, and there duly assigned Serial No. 98-15353.

BACKGROUND OF THE INVENTION

1. Field of the Invention

The present invention relates to a graphics processing method, and more particularly, to a clipping processing method.

2. Description of the Related Art

A three-dimensional (3D) graphics technique is widely used in various apparatuses communicating with the user through a screen, for example, in multimedia devices, game machines, and personal computers. Its application range is also gradually widening. The 3D graphics processing can be divided into geometry processing and rasterization. The geometry processing includes transformation, lighting, clipping and perspective projection. The rasterization includes interpolation and texture mapping.

As one example of a 3D graphics processing device, there is illustrated a 3D simulator device in FIG. 1. The 3D simulator device includes a control section 100, a virtual 3D space calculation section 102, an image synthesis section 104, and a cathode ray tube (CRT) 106. The 3D simulator device of FIG. 1 is disclosed in detail in U.S. Pat. No. 5,559,937, issued on Sep. 24, 1996. The 3D simulator device of FIG. 1 will now be described with reference to the above U.S. Pat. No. 5,559,937 on the assumption that it is applied to a 3D game. The virtual 3D space calculation section 102 sets a virtual 3D space in response to control signals from the control section 100 and to a game program stored in a central processing unit mounted in the control section 100. That is, the virtual 3D space calculation section 102 calculates the position of a 3D object and the arranged direction thereof. The image synthesis section 104 synthesizes a pseudo-3D image in response to setting information on the virtual 3D space from the virtual 3D space calculation section 102. The pseudo-3D image synthesized from the image synthesis section 104 is transmitted to the CRT 106 and displayed on a CRT screen. Then an observer who is a game player can see a 3D image appearing on the virtual 3D space through the pseudo-3D image displayed on the CRT screen.

The virtual 3D space where the observer sees the 3D image corresponds to a 3D image display region. This display region is represented as a viewing frustum 200 consisting of 6 planes 202–212, as indicated in FIG. 2. An observer 210 sees the 3D image within the viewing frustum 200 through the screen of the CRT 106. In this case, only an object within the viewing frustum 200 appears on the screen.

Meanwhile, the 3D image displayed within the viewing frustum 200 should be changed by rotation or conversion processing according to a change in factors, for example, the viewpoint position or line-of-sight direction of the observe 210, or the position or moving direction of a vehicle in which the observer 210 is seated. "Clipping processing" is one of 3D graphics processing for this and it is processed by the image synthesis section 104.

In clipping processing of graphics processing, it is simple to process objects which are inside or outside the viewing frustum 200, but it is necessary to perform interpolation with respect to objects which are on the boundary of the viewing frustum 200. That is, images which are outside the viewing frustum 200 whose vertex is the position of observer's eyes are excluded from an object to be processed, images which are inside the viewing frustum 200 are included for rendering, and the other part except a part within the viewing frustum 200 among images which are on the boundary of the viewing frustum 200 is clipped. The images for clipping processing are divided into polygons which are geometric units for graphics rendering.

In the following description, a triangle will be proposed as one form of the polygons. The triangle to be clipped in geometric units for graphics rendering is defined by three vertices each further defined in terms of the x, y, z coordinates, the R, G, B, A color values, and the U, V, S, T parameter values. This triangle is clipped with respect to each of the 6 planes 202–212 constituting the viewing frustum 200. Therefore, the 6 planes 202–212 correspond to "clipping planes".

FIG. 3 is an exemplary diagram illustrating triangles which are situated differently from each other with respect to one clipping plane. In FIG. 3, the clipping plane 206 is an example of one plane constituting the viewing frustum 200, and three triangles T1–T3 show the cases that triangles to be clipped can be situated with respect to the clipping plane 206. For the clipping processing, it should be determined whether a triangle is outside the viewing frustum 200 with respect to the clipping plane 206 like the triangle T1, whether it is inside the viewing frustum 200 like the triangle T3, or whether it is on the boundary of the clipping plane 206 like the triangle T2. The triangle T2 should be clipped, T1 is excluded from an object to be processed, and T3 is included as an object for rendering. If the triangle T2 is clipped, a quadrangle is left. This quadrangle is cut into two triangles.

FIG. 4 illustrates a general clipping processing procedure executed by, for example, the image synthesis section 104 of the 3D simulator device of FIG. 1. A triangle to be clipped is inputted at step 300. The first to sixth clipping planes 202–212 constituting the viewing frustum 200 are sequentially clipped at steps 302–312.

The clipping processing commonly performed at steps 302–312 shown in FIG. 4 is illustrated in FIG. 5. For the clipping processing, the position of a triangle to be clipped with respect to a clipping plane is determined. Thereafter, the triangle may be excluded from an object to be processed, included for rendering, or clipped according to the determined result.

A plane equation defining one infinite plane is represented by the following equation (1):

$$f(x,y,z) = ax + by + cz + d \tag{1}$$

where a, b, c and d are coefficients.

If a functional value $f(x,y,z)$ at a point $(x,y,z)$ is a positive value, that point is inside the plane, if it is a negative value, that point is outside the plane, and if it is 0, that point is on the plane. Therefore, the functional value for each vertex of the inputted triangle is calculated by the equation (1) to determine where the triangle is positioned.

At step 400, the functional values for three vertices of the triangle are calculated by the equation (1) with respect to the clipping plane. Assuming that three vertices are V1, V2 and V3, functional values f1, f2 and f3 at the vertices V1, V2 and V3 are calculated by substituting coordinate values of the vertices V1, V2 and V3 for the equation (1). At steps 402 and 404, the position of the triangle is determined. That is, whether the functional values f1 (=f(V1)), f2 (=f(V2)) and f3 (=f(V3)) are all less than 0 is checked at step 402. If they are less than 0, it is determined that the triangle is outside the clipping plane 206 like the triangle T1 shown in FIG. 3. In such a case, the triangle is excluded from an object to be processed and step 402 is followed by step 300 illustrated in FIG. 4. If all the functional values f1, f2 and f3 are not less than 0, it is checked at step 404 whether they are all greater than 0. If they are all greater than 0, it is determined that the triangle is inside the clipping plane 206 like the triangle T3 shown in FIG. 3. In that case, step 404 is followed by corresponding one among steps 302–312 to perform the clipping processing with respect to the next clipping plane. If the clipping processing with respect to the sixth clipping plane has been done, step 314 is performed. If all the functional values f1, f2 and f3 are not greater than 0 at step 404, it is judged that the triangle is on the boundary of the clipping plane 206 like T2 illustrated in FIG. 3. Then intersecting points are calculated and new vertices are made at step 406. Step 406 is followed by a corresponding one among steps 302–312 or by step 314 if the clipping processing with respect to the sixth clipping plane has been performed.

Through steps 302–312 shown in FIG. 4, the six clipping planes are sequentially clipped. Thereafter, if there is the remaining quadrangle, it is divided into two triangles at step 314 and a series of steps beginning from step 300 are performed. If not, rendering processing is executed at step 316 and step 316 is followed by step 300.

In the above-described clipping processing, the functional values of a plane equation for three vertices of a triangle should be calculated to determine where the triangle is situated. However, a multiplication operation and an addition operation are needed 3 times per operation to calculate the functional value using the plane equation (1). Moreover, Boolean operation is implemented at steps 402 and 404 shown in FIG. 5 twice per step. That is, in order to judge the position of one triangle, the multiplication operation is needed 9 times, the addition operation 9 times, the comparison operation 6 times, and the Boolean operation 4 times. Since these operations should be calculated with respect to 6 planes constituting the viewing frustum, lots of calculations are demanded.

Generally, the geometric processing among the 3D graphics processing requires a floating point calculation occupied mainly by the clipping processing. The number of operations necessary for the clipping processing has a great influence on the performance of graphics. Therefore, the clipping processing is a main obstacle to the improvement of the performance of graphics.

SUMMARY OF THE INVENTION

It is therefore an object of the present invention to provide a clipping processing method which can simplify a clipping process in graphics processing.

It is another object of the present invention to provide a clipping processing method which can reduce the number of operations for clipping processing in graphics processing.

To achieve these objects, there is provided a method for determining a position at which a polygon to be clipped is situated with respect to a clipping plane to perform clipping processing. The method includes the steps of selecting a bounding volume sufficiently enclosing the polygon, and judging a position at which the bounding volume is situated with respect to the clipping plane to be the position at which the polygon is situated.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, numerous specific details, such as a polygon type and a processing flow, are set forth to provide a more thorough understanding of the present invention. It will be apparent, however, to one skilled in the art that the present invention may be practiced without these specific details. In other instances, well known constructions or functions are not described in detail so as not to obscure the present invention. Further, a triangle is proposed as one form of a polygon.

A bounding volume is used for the clipping processing. That is, the bounding volume sufficiently enclosing a polygon is used to determine the position of the polygon to be clipped. Next, the position at which the bounding volume is situated is determined instead of the position of the polygon. Thus a clipping process is simplified by reducing the number of operations necessary for clipping processing.

Figure 6:
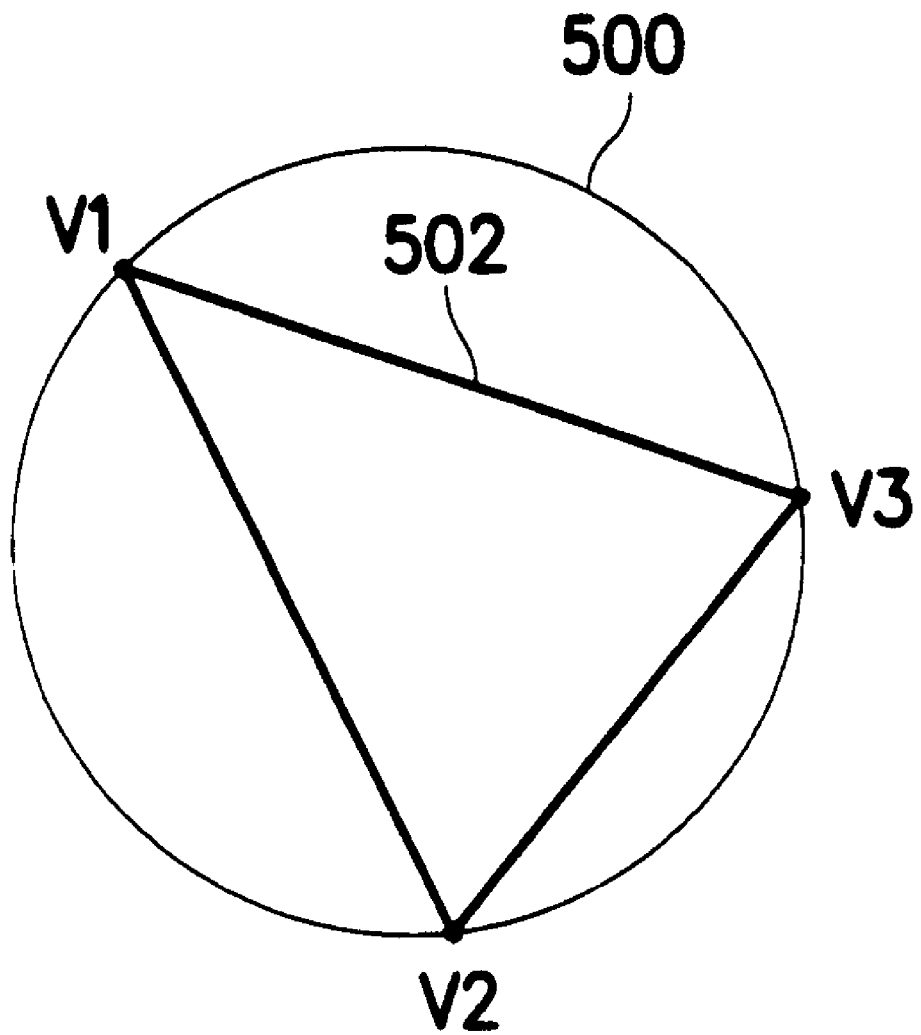
FIG. 6 is an exemplary diagram illustrating a bounding volume according to the present invention.

At least one sphere sufficiently enclosing the triangle to be clipped is selected as a bounding volume as illustrated in FIG. 6. Namely, a sphere circumscribed about a triangle 502 is selected as a bounding volume 500. A center S and a radius r of the bounding volume 500 can be calculated by the following equation (2):

$$S=(V1+V2+V3)/3, \quad r=|V1-S1| \qquad (2)$$

where V1, V2 and V3 are coordinate values of three vertices of the triangle 502.

Figure 1:
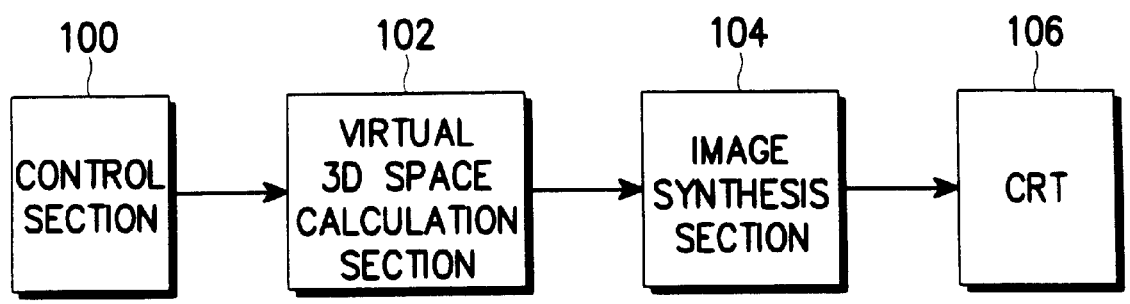
FIG. 1 is a schematic block diagram of a general 3D simulator device.
Figure 2:
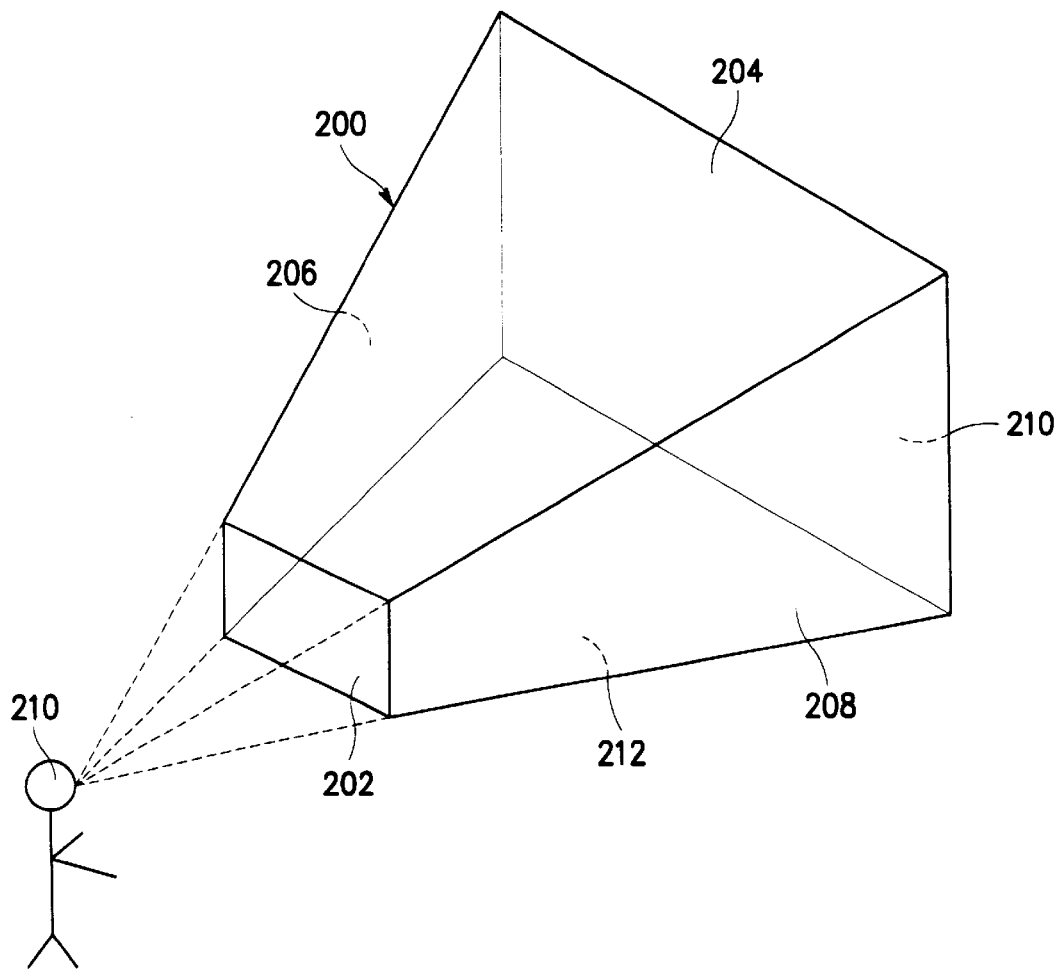
FIG. 2 is an exemplary diagram illustrating a viewing frustum.
Figure 3:
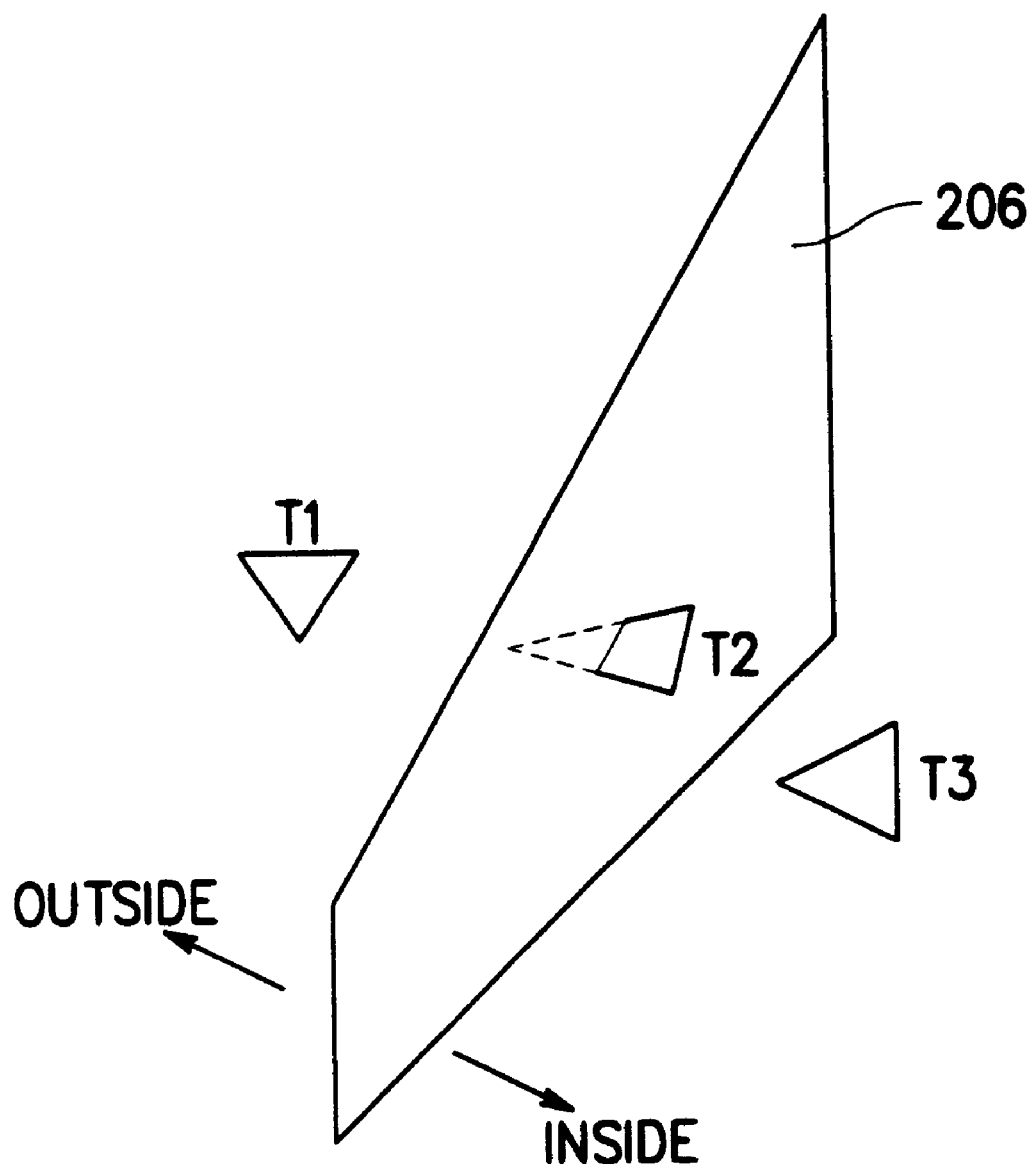
FIG. 3 an exemplary diagram illustrating triangles which are situated differently from each other with respect to one clipping plane.
Figure 4:
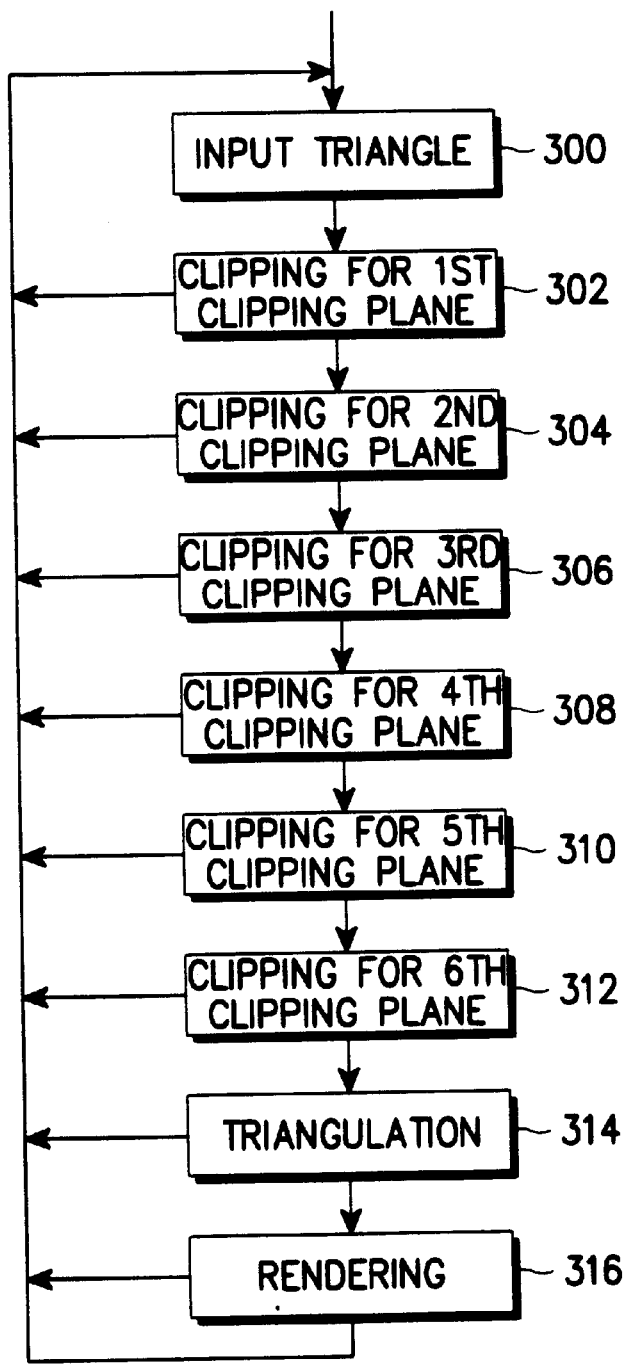
FIG. 4 is a flow chart illustrating a general clipping processing procedure.
Figure 5:
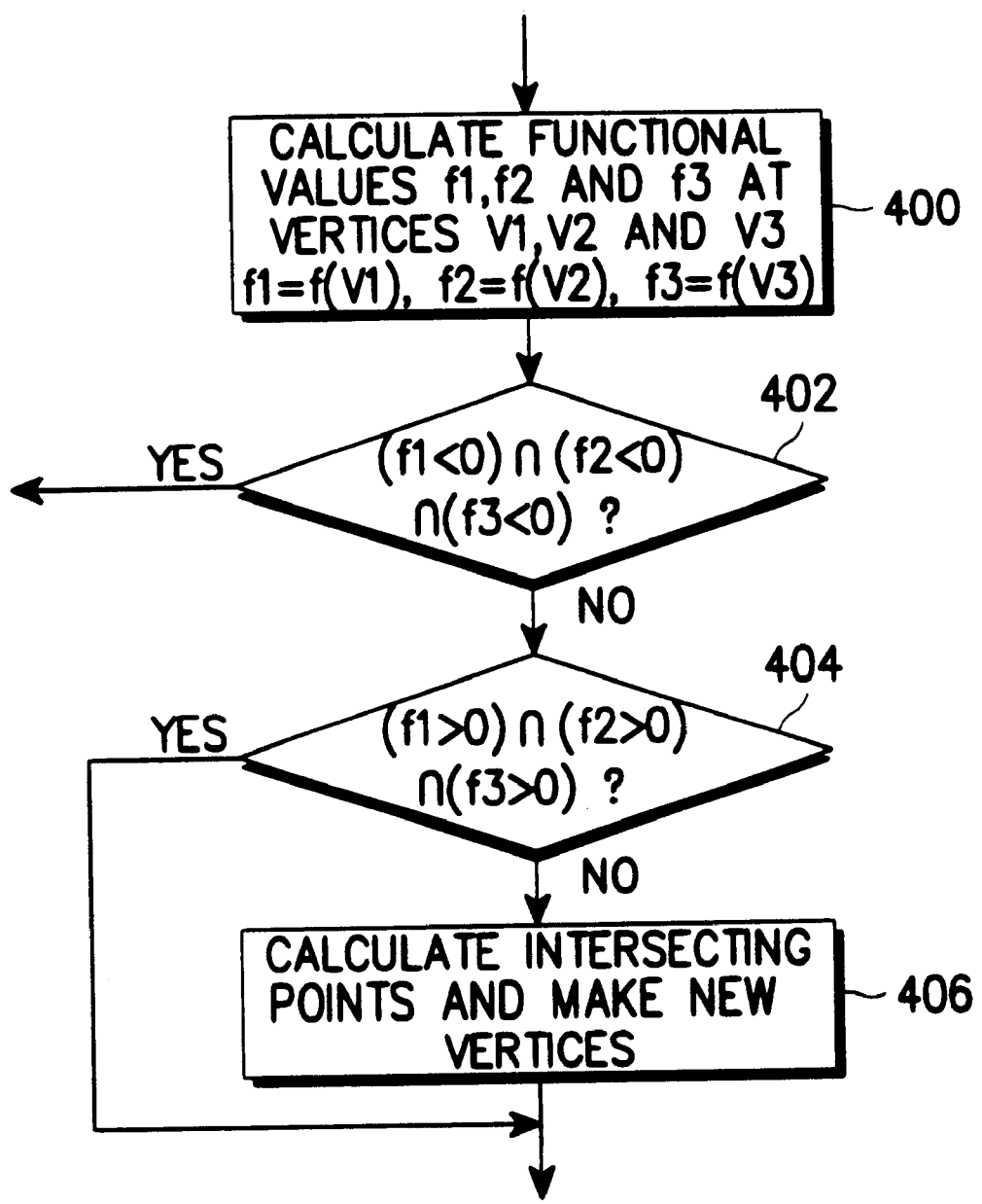
FIG. 5 is a flow chart illustrating clipping processing with respect to one clipping plane.
Figure 7:
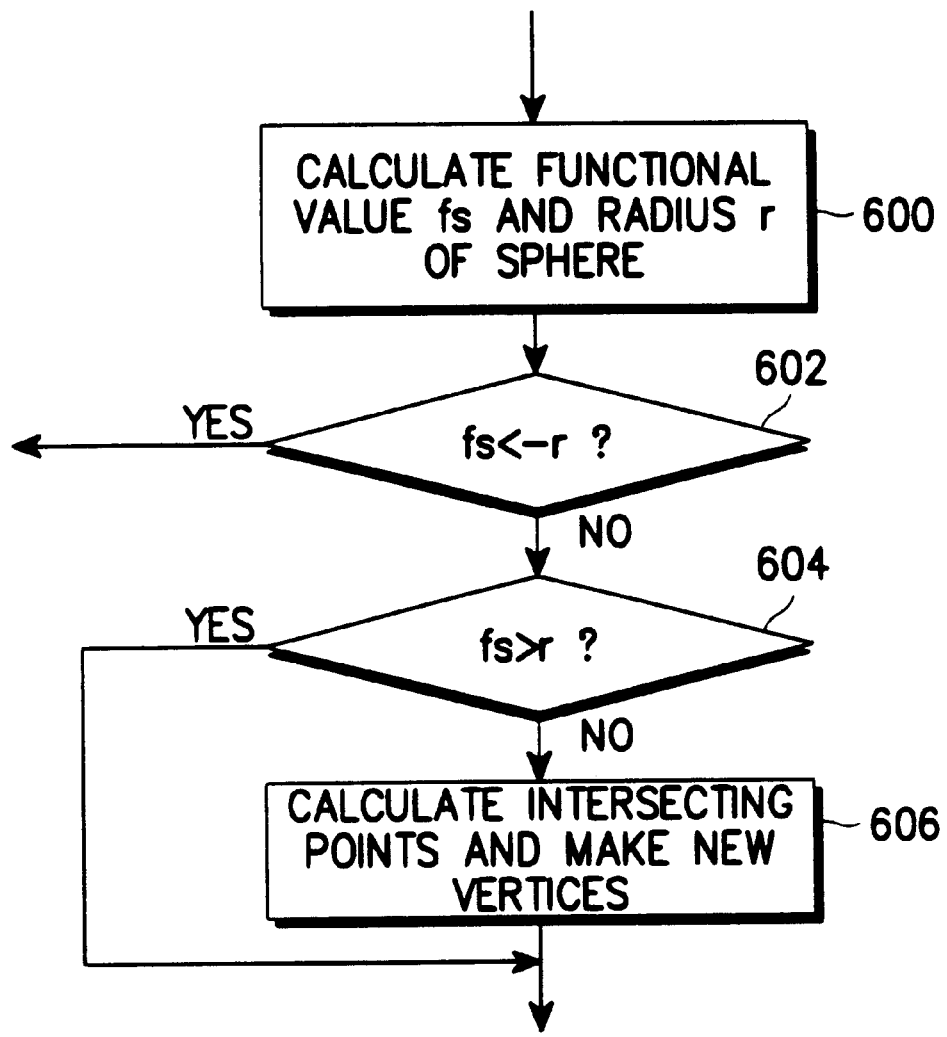
FIG. 7 is a flow chart illustrating clipping processing with respect to one clipping plane according to the present invention.

FIG. 7 is a flow chart illustrating the clipping processing with respect to one clipping plane. Steps 400–404 shown in FIG. 5 are changed to steps 600–604. Step 606 is the same as step 406 shown in FIG. 5. The entire clipping processing procedure is the same as that of FIG. 4. If the operation of FIG. 7 is applied to the 3D simulator device of FIG. 1, it is executed by the image synthesis section 104.

At step 600, a functional value fs at the center S of a sphere circumscribed about a triangle to be clipped with respect to one clipping plane, and the radius r of the sphere are calculated by the above equation (2). At steps 602 and 604, the functional value fs is compared with the negative value of the radius r and with the radius r, respectively.

Figure 8:
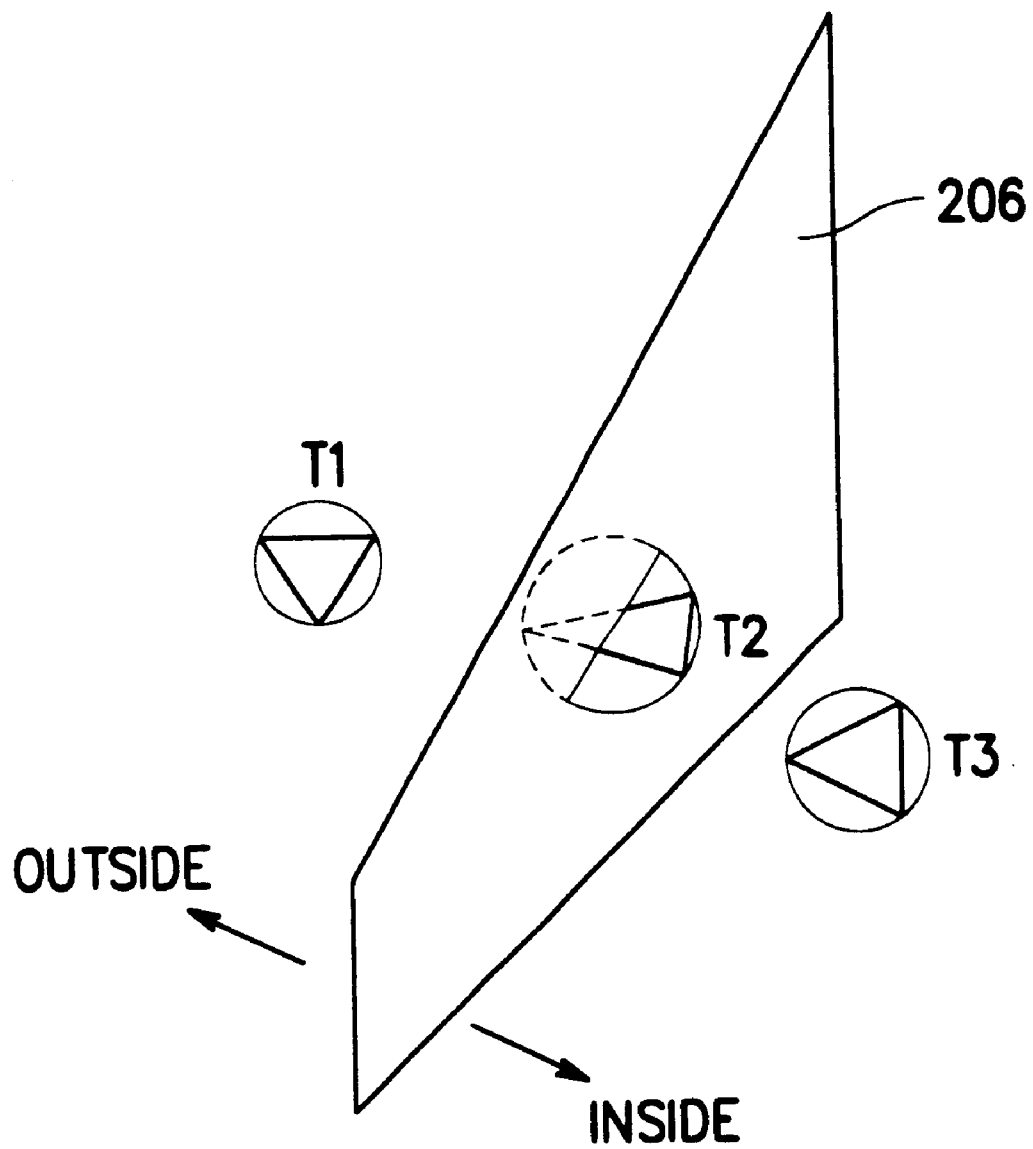
FIG. 8 is an exemplary diagram for geometrically describing clipping processing according to the present invention.

If the functional value fs is less than the negative value of the radius r (that is, fs<−r), it is determined that the triangle is outside the viewing frustum 200 with respect to the clipping plane 206 like a bounding volume T1 shown in FIG. 8. Then the triangle is excluded from an object to be processed. That is, if the functional value fs is less than the negative value of the radius r, step 602 is followed by step 300 shown in FIG. 4.

If the functional value fs is greater than the radius r, it is judged that the triangle is inside the viewing frustum 200 with respect to the clipping plane 206 like a bounding volume T3 shown in FIG. 8. Then step 604 is followed by a corresponding one among steps 302–312 to perform the clipping processing with respect to the next clipping plane or by step 314 if the clipping processing with respect to the sixth clipping plane has been performed.

If the functional value fs is not less than the negative value of the radius r, and if it is not greater than the radius r, it is determined that the triangle is on the boundary of the viewing frustum 200 with respect to the clipping plane 206 like a bounding volume T2 illustrated in FIG. 8. Therefore, intersecting points are calculated and new vertices are made at step 606. Step 606 is followed by a corresponding one among steps 302–312 or by step 314 if the clipping processing with respect to the sixth clipping plane has been performed.

Thus, only the functional value fs at the center of the bounding volume 500 and the radius r of the bounding volume 500 are calculated by the equation (2) for clipping processing. Therefore, the multiplication operation is needed 3 times and the addition operation is needed twice to calculate the functional value fs, and the addition operation is needed once to calculate the radius r. Moreover, the comparison operation is needed twice at steps 602 and 604. That is, in order to determine the position of one triangle, the multiplication operation is needed 3 times, the addition operation 3 times and the comparison operation twice. There is no need to calculate the Boolean operation. In the following Table 1, the number of operations are compared.

|  | No. of additions | No. of multiplications | No. of comparisons | No. of Boolean operations |
|---|---|---|---|---|
| Prior Art | 9 | 9 | 6 | 4 |
| Invention | 3 | 3 | 2 | 0 |

Therefore, the clipping process is simplified by using the bounding volume, and the number of operations necessary for the clipping processing is greatly reduced, thereby improving the performance of graphics.

While the invention has been shown and described with reference to a certain preferred embodiment thereof, it will be understood that the present invention should not be limited to the specific embodiment illustrated above. For example, the present invention may be applied to two-dimensional graphics, and all kinds of polygons as well as the triangle. Therefore, the present invention should be understood as including all possible embodiments and modifications which do not depart from the spirit and scope of the invention as defined by the appended claims.

What is claimed is:

1. A 3D graphics processing system capable of determining a position at which a polygon to be clipped is situated with respect to clipping planes constituting a viewing frustum, said viewing frustum having a vertex positioned relative to a viewer, to perform clipping processing, said system comprising a processor for executing instructions comprising:

calculating a functional value at a center of a sphere circumscribed about said polygon from coordinate values of vertices of said polygon with respect to said clipping planes;

calculating a radius of said sphere;

comparing said functional value with said radius and with a negative value of said radius;

if said functional value is less than said negative value of said radius, judging that said polygon is outside said viewing frustum;

if said functional value is greater than said radius, judging that said polygon is inside said viewing frustum;

if said functional value is not less than said negative value of said radius and if said functional value is not greater than said radius, judging that said polygon is on the boundary of said viewing frustum; and outputting a result of said judging as indicative of said position at which said polygon is situated with respect to said viewing frustum, whereby performing said clipping processing is based on said result.

2. A recordable medium for storing thereon computer-executable instructions for determining a position at which a polygon to be clipped is situated with respect to clipping planes constituting a viewing frustum, said viewing frustum having a vertex positioned relative to a viewer, to perform clipping processing, said instructions comprising:

calculating a functional value at a center of a sphere circumscribed about said polygon from coordinate values of vertices of said polygon with respect to said clipping planes;

calculating a radius of said sphere;

comparing said functional value with said radius and with a negative value of said radius;

if said functional value is less than said negative value of said radius, judging that said polygon is outside said viewing frustum;

if said functional value is greater than said radius, judging that said polygon is inside said viewing frustum;

if said functional value is not less than said negative value of said radius and if said functional value is not greater than said radius, judging that said polygon is on the boundary of said viewing frustum; and outputting a result of said judging as indicative of said position at which said polygon is situated with respect to said viewing frustum, whereby performing said clipping processing is based on said result.

3. A computer-readable medium carrying out one or more sequences of instructions for determining a position at which a polygon to be clipped is situated with respect to clipping planes constituting a viewing frustum, said viewing frustum having a vertex positioned relative to a viewer, to perform clipping processing, wherein execution of the one or more sequences of instructions by one or more processors causes the one or more processors to perform the steps of:

calculating a functional value at a center of a sphere circumscribed about said polygon from coordinate values of vertices of said polygon with respect to said clipping planes;

calculating a radius of said sphere;

comparing said functional value with said radius and with a negative value of said radius;

if said functional value is less than said negative value of said radius, judging that said polygon is outside said viewing frustum;

if said functional value is greater than said radius, judging that said polygon is inside said viewing frustum;

if said functional value is not less than said negative value of said radius and if said functional value is not greater than said radius, judging that said polygon is on the boundary of said viewing frustum; and outputting a result of said judging as indicative of said position at which said polygon is situated with respect to said viewing frustum, whereby performing said clipping processing is based on said result.

4. A data signal embodied in a carrier wave, the data signal carrying out one or more sequences of instructions for determining a position at which a polygon to be clipped is situated with respect to clipping planes constituting a viewing frustum, said viewing frustum having a vertex positioned relative to a viewer, to perform clipping processing, wherein execution of the one or more sequences of instructions by one or more processors causes the one or more processors to perform the steps of:

calculating a functional value at a center of a sphere circumscribed about said polygon from coordinate values of vertices of said polygon with respect to said clipping planes;

calculating a radius of said sphere;

comparing said functional value with said radius and with a negative value of said radius;

if said functional value is less than said negative value of said radius, judging that said polygon is outside said viewing frustum;

if said functional value is greater than said radius, judging that said polygon is inside said viewing frustum;

if said functional value is not less than said negative value of said radius and if said functional value is not greater than said radius, judging that said polygon is on the boundary of said viewing frustum; and outputting a result of said judging as indicative of said position at which said polygon is situated with respect to said viewing frustum, whereby performing said clipping processing is based on said result.

* * * * *